(12) United States Patent
Wasserbauer (10) Patent No.: US 12,320,448 B2
(45) Date of Patent: Jun. 3, 2025

(54) MICROCHANNEL VALVE APPARATUS, SYSTEM, AND METHOD

(71) Applicant: MICROGLASS LLC, Castro Valley, CA (US)

(72) Inventor: John Wasserbauer, Castro Valley, CA (US)

(73) Assignee: MICROGLASS LLC, Castro Valley, CA (US)

( * ) Notice: Subject to any disclaimer, the term of this patent is extended or adjusted under 35 U.S.C. 154(b) by 345 days.

(21) Appl. No.: 17/382,235

(22) Filed: Jul. 21, 2021

(65) Prior Publication Data

US 2023/0023011 A1    Jan. 26, 2023

(51) Int. Cl.
*F16K 99/00*    (2006.01)

(52) U.S. Cl.
CPC ...... *F16K 99/0013* (2013.01); *F16K 99/0046* (2013.01)

(58) Field of Classification Search
CPC .................. F16K 99/0013; F16K 99/0046
See application file for complete search history.

(56) References Cited

U.S. PATENT DOCUMENTS

| | | | |
|---|---|---|---|
| 6,702,256 B2* | 3/2004 | Killeen | F16K 99/0001 251/304 |
| 7,093,818 B2* | 8/2006 | Koeneman | F16K 27/048 251/207 |
| 10,012,640 B2* | 7/2018 | Pant | B01L 3/502715 |
| 10,415,721 B2* | 9/2019 | Xin | F16K 99/0013 |
| 10,596,569 B2* | 3/2020 | Bohm | C12Q 1/6869 |

* cited by examiner

*Primary Examiner* — Eric Keasel
(74) *Attorney, Agent, or Firm* — Wasserbauer Law, LLC; Nicholas E. Blanton, Esq.; Damian G. Wasserbauer, Esq.

(57) ABSTRACT

The present disclosure relates to an apparatus, system and method for a microchannel valve. The valve is configured to control or switch the flow of gasses or liquids. The valve includes a first substrate with a microchannel interrupted by a rotational element having a matching microchannel. The rotational element is attached to a second substrate in contact with the first. Actuation of the valve is achieved by rotating the second substrate relative to the first. The valve may be configured for capillary input and output, and/or for high pressure operation by means of capillary retention features. The valve may be disposed within a subassembly for maintaining contact, axial alignment, and relative rotational alignment between the first and second substrates. The present disclosure also provides a method for fabricating the valve. The present disclosure also provides ways to eliminate gaps between the two substrates.

20 Claims, 12 Drawing Sheets

MICROCHANNEL VALVE APPARATUS, SYSTEM, AND METHOD

TECHNICAL FIELD

The present disclosure relates to an apparatus, system, and method for a valve and, in particular, to a valve apparatus for microchannels that may be used in microfluidic systems.

BACKGROUND

Many advances have been made in the miniaturization of fluidics and channels. The technologies of microchannels and microfluidics now serve a host of applications, such as drug discovery, DNA sequencing, electrophoresis and sensing. In a microfluidic system, for example, microfluidic valves control the flow of the fluid through the channels or between the other microfluidic components, such as tanks, mixers, pumps and chambers. Often, these and other applications require the gating or segmentation of the analyte.

In general, a valve is a device that regulates the flow of materials, such as gases, fluids, slurries, or liquids, by opening, closing, or partially obstructing various passageways. The valve includes a valve body and channels that allow flow into and out of the valve, typically referred to as ports. Ports are obstructed or opened by a valve member or disc to control the fluid flow. Valves with two or three ports are the most common, while valves with multiple ports are used in special applications. All valves or valve networks are built with some means of external connection at the ports.

Figure 1A:
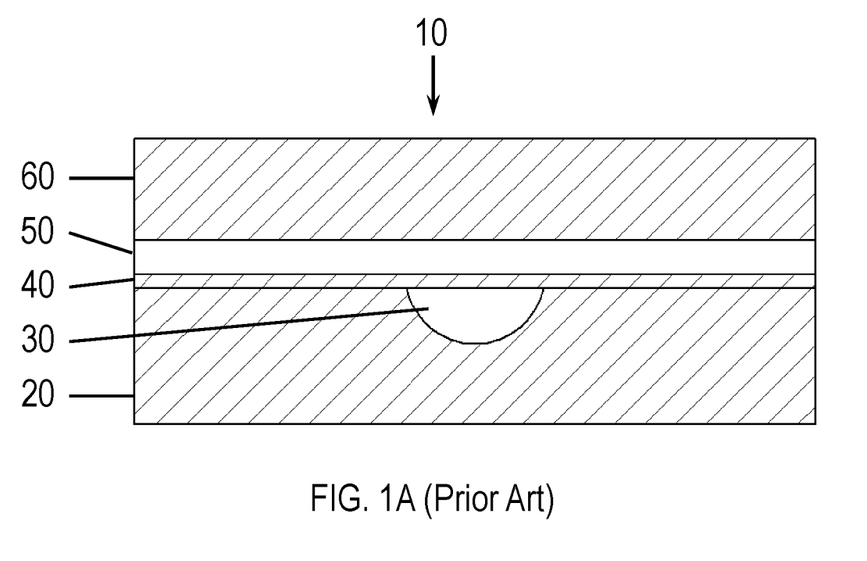
FIG. 1A illustrates a sectional view of a diaphragm-type shutoff valve, shown in the ON or open position, according to the prior art.
Figure 1B:
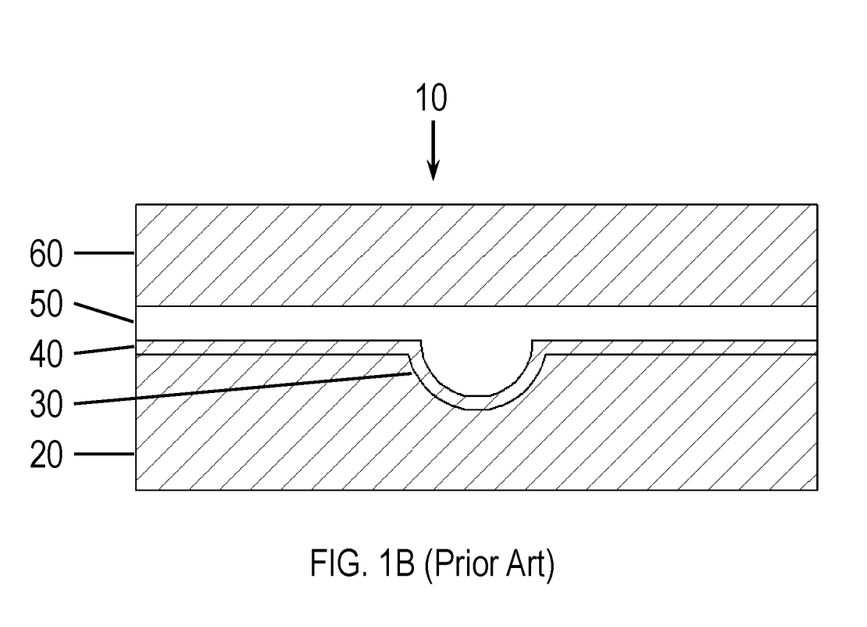
FIG. 1B illustrates a sectional view of a diaphragm-type shutoff valve, shown in the OFF or closed position, according to the prior art.

Several types of valves have been developed, including diaphragm, ball, blade, and pinch valves, using a variety of actuation principles, including electrostatic, magnetic, piezoelectric, bimorphic, pneumatic, thermo-pneumatic hydraulic, and pressure-sensitive capillary. One of the most common types of valves, a diaphragm valve is typically used as a shut-off valve in process systems within the food and beverage, pharmaceutical and biotech industries. The valve 10, illustrated in FIGS. 1A and 1B, operates via the deformation of a membrane 40 sandwiched between first and second channels, 30 and 50, respectively, disposed adjacent one another. FIG. 1A shows the open position (i.e., ON position), where channel 30 allows the flow of fluid through the sectional area (shown here as semi-circular). FIG. 1B similarly shows the closed position (i.e., OFF position), where a pressure differential is produced within second channel 50 with respect to first channel 30. In this manner, membrane 40 plastically deforms such that it conforms to the profile of the lower portion of channel 30. As the membrane 40 deforms it reaches the opposite wall of the lower portion of channel 30, thereby pinching off the flow. Deformation of the membrane 40 is often achieved pneumatically or hydraulically, although any of the other aforementioned techniques may also be used. One drawback to such actuation is that separate control lines and inputs must be fabricated for each independently operated valve, adding to the complexity and cost. In addition, conventional diaphragm valve designs are not well suited for regulating and controlling process flows, nor are they suitable for high pressure flows.

What is needed is a low-cost valve suitable for use with microchannels and bulk capillaries, mechanical or electrical actuation, and low- or high-pressure gasses or fluids. In some microfluidic applications, it would be desirable to have a microfluidic valve that actively controls the flow of fluid in a microfluidic system that has a relatively constant fluid pressure. Furthermore, other desirable features and characteristics will become apparent from the subsequent detailed description and the appended claims, taken in conjunction with the accompanying drawings and this background of the disclosure.

SUMMARY

It is an object of the present disclosure to provide an apparatus, system and method for a microchannel valve that is compatible with capillaries and high-pressure gasses and/or fluids.

It is an object of the present disclosure to provide a microchannel valve that is compatible with capillaries and high-pressure gasses or fluids that may operate at a gauge pressure of at least 1,000 psi.

It is an object of the present disclosure to provide a microchannel valve with ON/OFF switching capability.

It is an object of the present disclosure to provide a microchannel valve with sufficient resolution for controlled, variable flow capability.

It is an object of the present disclosure to provide a microchannel valve for applications including, but not limited to, drug discovery, DNA/gene sequencing, electrophoresis, and/or sensing of gas and/or fluid properties of microfluidic systems.

DESCRIPTION OF THE DRAWINGS

Non-limiting and non-exhaustive embodiments of the present disclosure are described with reference to the following drawings. In the drawings, like numerals describe like components throughout the several views.

For a better understanding of the present disclosure, reference will be made to the following Detailed Description, which is to be read in association with the accompanying drawings, which are incorporated in and constitute a part of this specification, show certain aspects of the subject matter disclosed herein and, together with the description, help explain some of the principles associated with the disclosed implementations, wherein.

DETAILED DESCRIPTION

Non-limiting embodiments of the invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention. The drawings featured in the figures are provided for the purposes of illustrating some embodiments of the invention and are not to be considered as limitation thereto.

Figure 2A:
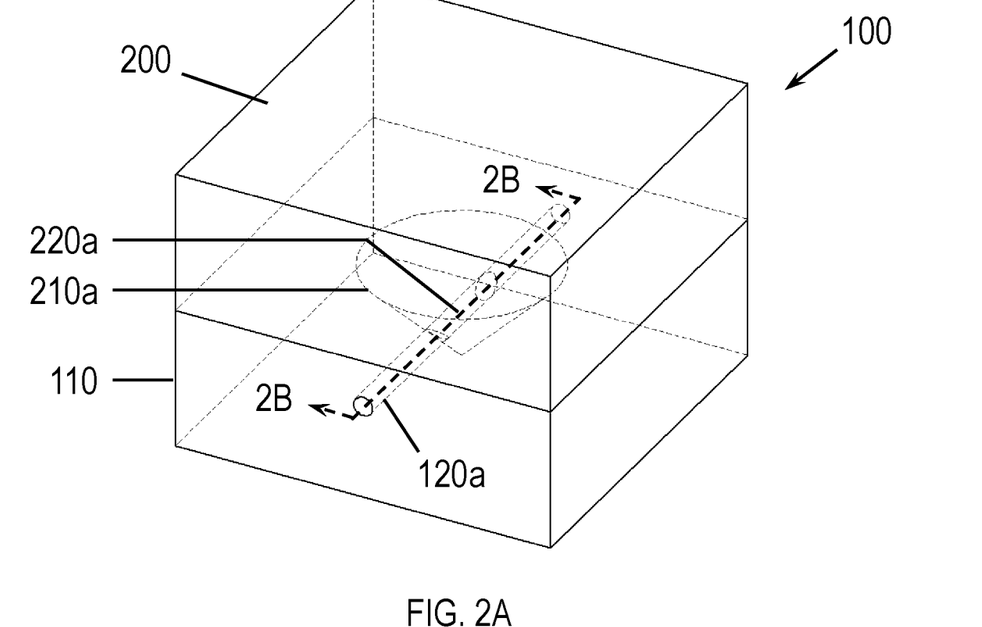
FIG. 2A illustrates a perspective view of an ON/OFF microchannel valve apparatus, system and method, according to an embodiment of the present invention.
Figure 2B:
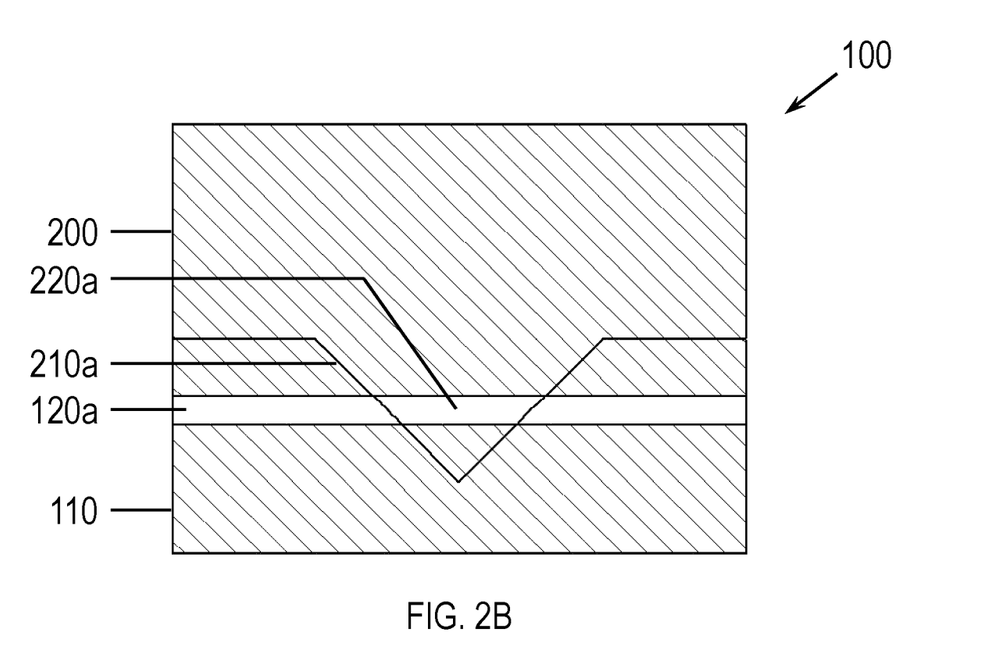
FIG. 2B illustrates a sectional view thereof.

FIGS. 2A and 2B show, in a first embodiment, a microchannel valve 100 configured for manual operation. The valve 100 comprises a first substrate 110 and a second substrate 200 disposed thereon. The first substrate 110 may include a microchannel 120a capable of conducting a gas (micro-pneumatic) or a fluid (microfluidic). The channel 120a may be segmented by a rotatable element 210a, shown in FIG. 2A in the shape of a cone. Alternatively, the rotatable element 210a may have any rotationally symmetric shape, such as a cylinder or sphere. The rotatable element 210a may be fixed to the second substrate 200. The rotatable element 210a may further comprise a second microchannel 220a that aligns at each opening of the first microchannel 120a when the valve 100 is in the open position, to allow passage of fluid through the valve 100. When the second substrate 200 is rotated sufficiently away from the open position, first and second channels 120a, 220a become misaligned, the gas or fluid flow is blocked, and the valve 100 is in the closed position. As shown in FIGS. 2A and 2B, the second substrate 200 may be rotated manually relative to the first substrate 110 to actuate valve 100. This may be achieved by a variety of means, including, but not limited to, finger touch, tweezers, a wrench or other custom tool.

Figure 3A:
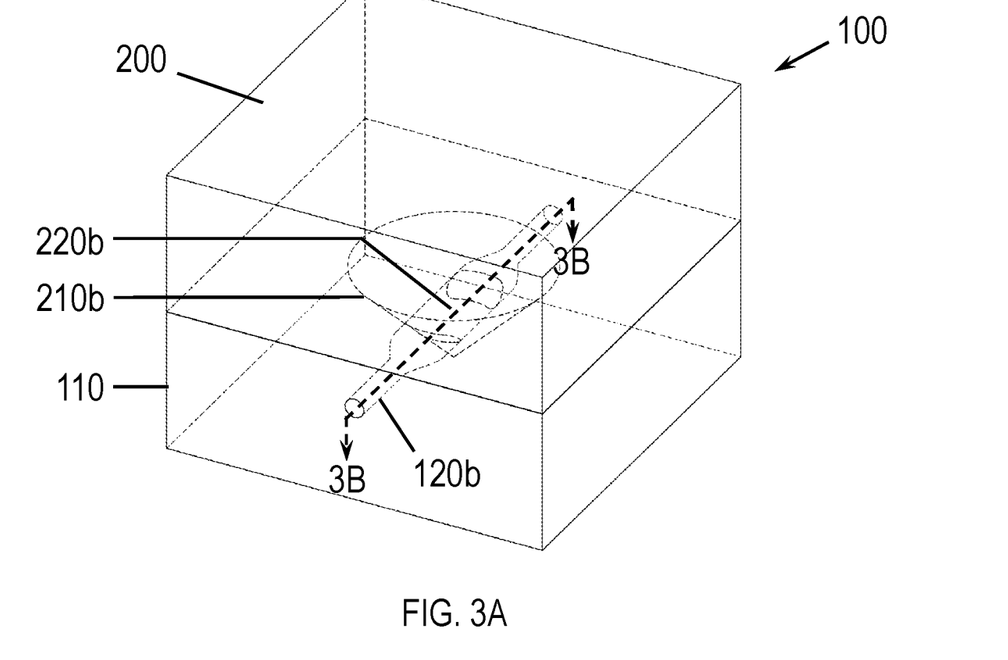
FIG. 3A illustrates a perspective view of a controllable microchannel valve apparatus, system and method, according to an embodiment of the present disclosure.
Figure 3B:
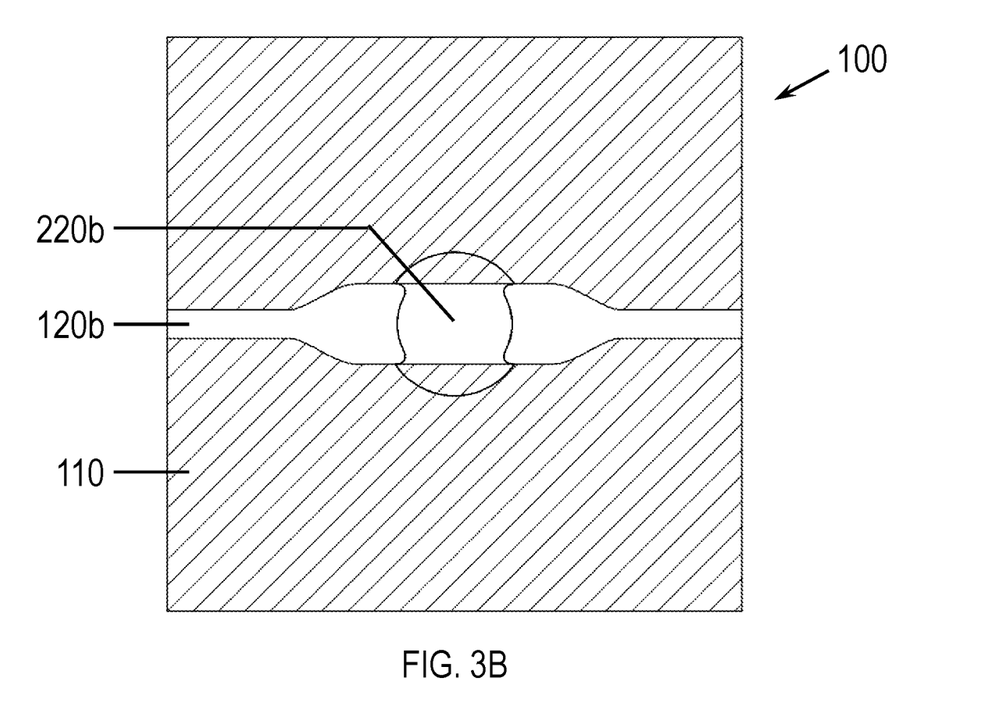
FIG. 3B illustrates a sectional view thereof.

FIGS. 3A and 3B show, in a second embodiment, a controllable microchannel valve 100. The valve 100 may similarly include a first substrate 110 and a second substrate 200 disposed thereon. The first substrate 110 may further include a micro-pneumatic or microfluidic channel 120b. The channel 120b is segmented by a rotatable element 210b, shown in FIG. 3A in the shape of a cone. Alternatively, the rotatable element 210b may take the form of any rotational shape, such as a cylinder or sphere. The rotatable element 210b may be fixed to the second substrate 200. Furthermore, the rotatable element 210b may further comprise a second microchannel 220b that aligns at each opening of the first microchannel 120b when the valve 100 is in the open position, to allow passage of fluid through the valve 100. Referring to FIG. 3B, the microchannel 120b cross-sectional profile may change shape along a portion adjacent to the rotatable element 210b and first substrate 110 interface. In particular, the profile may subtend a larger angle of the rotatable element 210b, thereby requiring a larger rotation of rotatable element 210b to shut off the flow. Between the aligned "open" position and misaligned "closed" position, a partial overlap of the profiles of channels 120b, 220b may occur on either side of the rotatable element 210b. The cross-sectional area formed by this overlapped profile may substantially increase and/or decrease linearly with the angle of rotation. Alternatively, the corresponding profiles of the microchannel 120b and element channel 220b may be shaped to produce a nonlinear overlap as a function of angular rotation, as desired. With sufficient control of the angular rotation of the top substrate 200 relative to the bottom substrate 110, the valve 100 may be used to effectively control any amount of flow between the open and closed states.

Figure 4A:
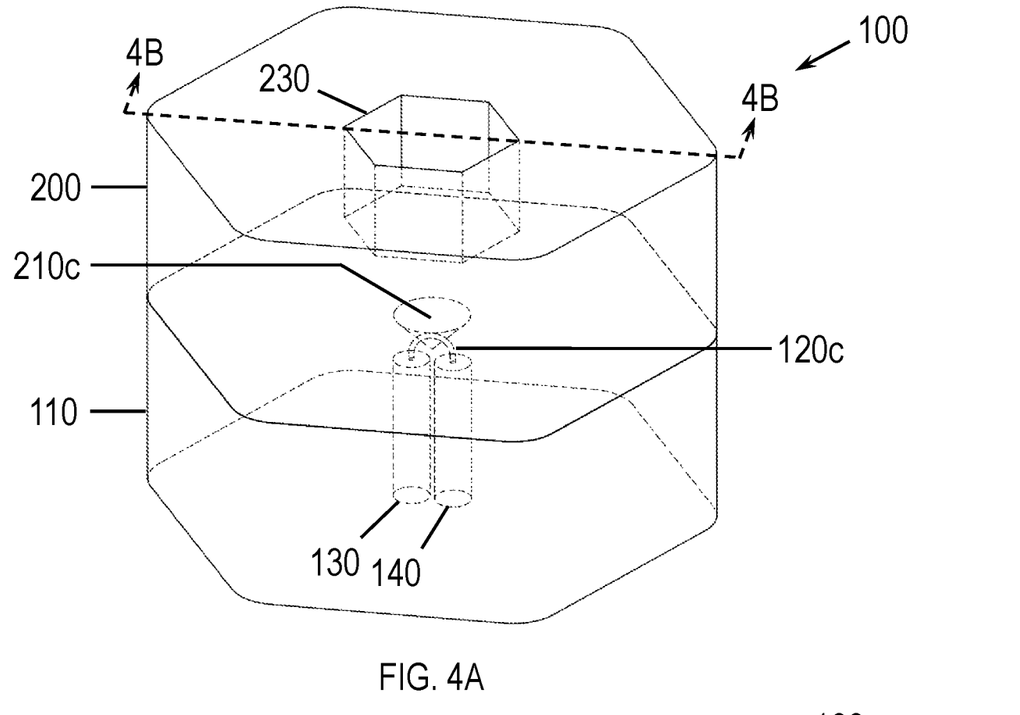
FIG. 4A illustrates a perspective view of a chip-based microchannel valve apparatus, system and method, configured for capillary input and output, according to an embodiment of the present disclosure.
Figure 4B:
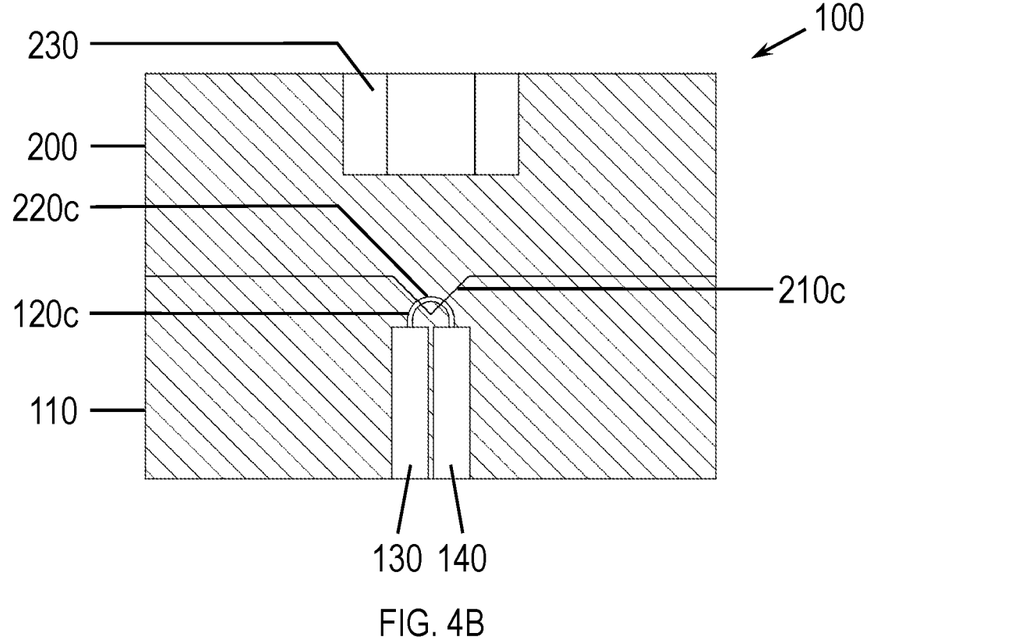
FIG. 4B illustrates a sectional view thereof.

FIGS. 4A and 4B illustrate, in a third embodiment, a microchannel valve 100 configured for capillary-based input and output. A first substrate 110 and a second substrate 200 may each have a hexagonal shape. A microchannel 120c may be formed inside the first substrate 110. Input 130 and output 140 vias may be formed within first substrate 110 such that the vias 130, 140 fluidly connect to the channel 120c. The channel 120c may be segmented by a rotationally-symmetric (e.g. cone-shaped) rotational element 210c, thereby forming a matching channel 220c therein. The rotational element 210c may be welded to the bottom of the second substrate 200. A socket 230 may be formed in the top of the second substrate 200 so that a tool, such as a hexagonal wrench, may be used to rotate the second substrate 200 relative to the first substrate 110. The hexagonal extents of the first 110 and second 200 substrates may include datums, such as a flat or indentation, that are used to align the microchannels 120c, 220c within the glass. Alternatively, any other shape and datum may be used for the substrate extents and alignment keys that achieves proper alignment of first and second substrates 110, 200, without departing from the scope of this disclosure. When the microchannels 120c and 210c are aligned, the valve 100 is open. Conversely, when the microchannels 120c and 210c are sufficiently misaligned, the valve 100 is closed.

To increase the operating pressure of the valve 100, several means of increasing the retention force of the input and output vias are provided. A first method (not shown) is to size the vias 130, 140 such that the input and output capillaries press fit into the vias 130, 140. This may be facilitated by a compliant element, such as a polymer coating on the capillary. In this case the insertion force and retention force are substantially the same. In some applications it is desirable to be able to withstand pressures of 1000s of pounds per square inch (kpsi), requiring a retention force of more than a few ounces. However, for assembly purposes the insertion force cannot be made too great, no more than a few ounces, or the glass capillary may break. Therefore, it is desirable to realize a retention force that is greater than the insertion force, referred to as a differential extraction/insertion force.

Figure 5A:
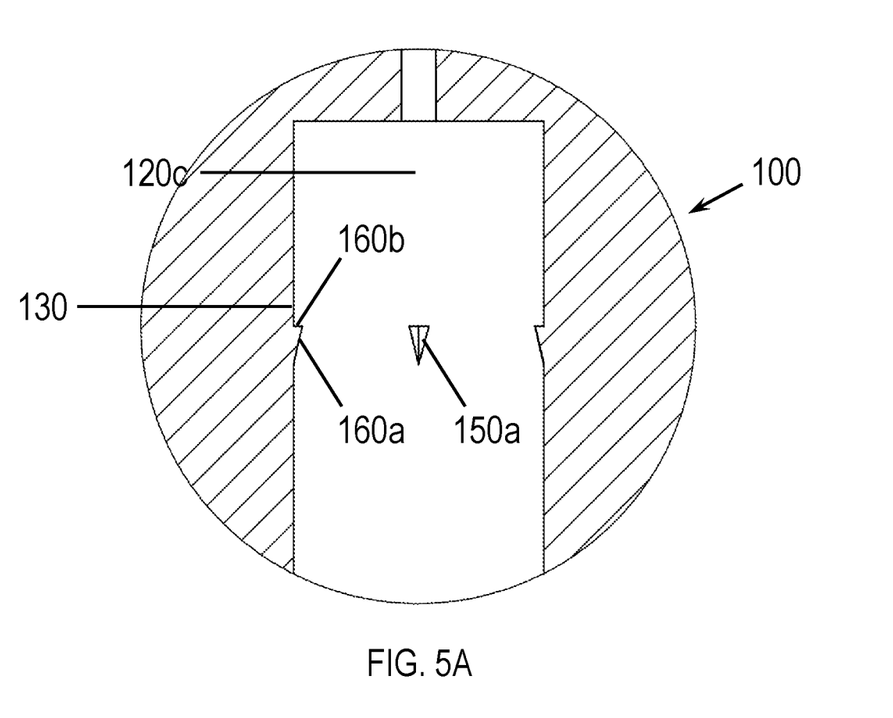
FIG. 5A illustrates an enlarged sectional view of capillary vias with retention features including rigid barbs, according to an embodiment of the present disclosure.

A second method for increasing the operating pressure of the valve, shown in FIG. 5A, comprises small, rigid barbs 150a disposed on the wall of the via 130. The barbs 150a, in turn, comprise a shallow slope 160a on the insertion side and steep-to-re-entrant slope 160b on the channel 120c side. Upon insertion, the outer polymer coating of the capillary deforms as the capillary slides past the barb 150a. In the reverse direction, the barb 150a digs into the polymer coating, increasing the extraction force.

Figure 5B:
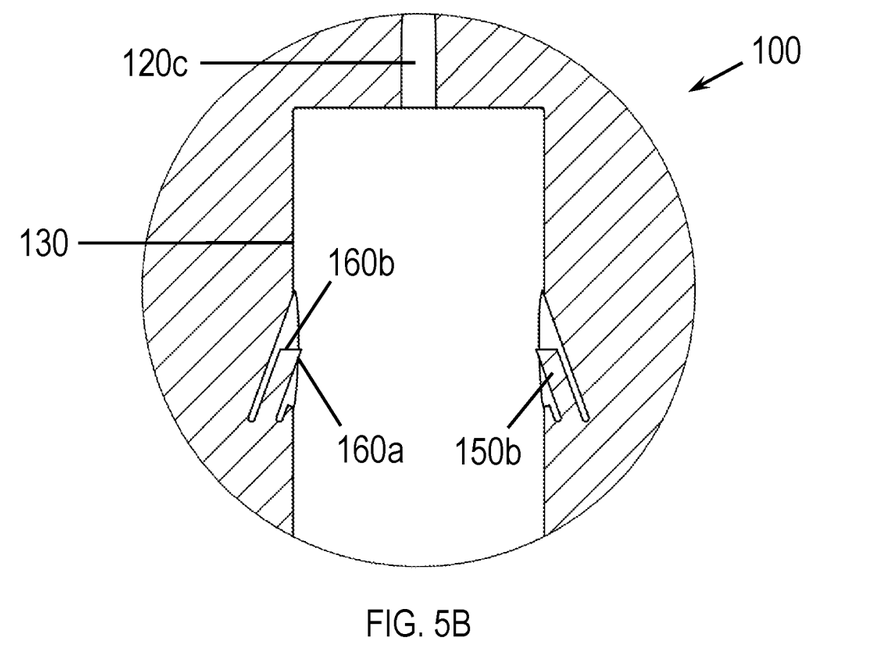
FIG. 5B illustrates an enlarged sectional view of capillary vias with retention features including flexible barbs, according to an alternative embodiment of the present disclosure.

A third method of increasing the retention force is shown in FIG. 5B. In this method, flexible barbs 150b are formed within the wall of the via 130. As in the rigid barb 150a case, the barbs 150b have a shallow slope 160a on the insertion side and steep-to-re-entrant slope 160b on the channel side. The barbs 150b bend away as the capillary is inserted and dig into the polymer coating as the capillary is extracted, thereby realizing a differential extraction/insertion force. It will be appreciated by one skilled in the art that many variations are possible, such as other protrusion shapes, sizes and geometries. It is intended that all features which give rise to a differential extraction/insertion force are included in the scope of this disclosure.

Figure 6A:
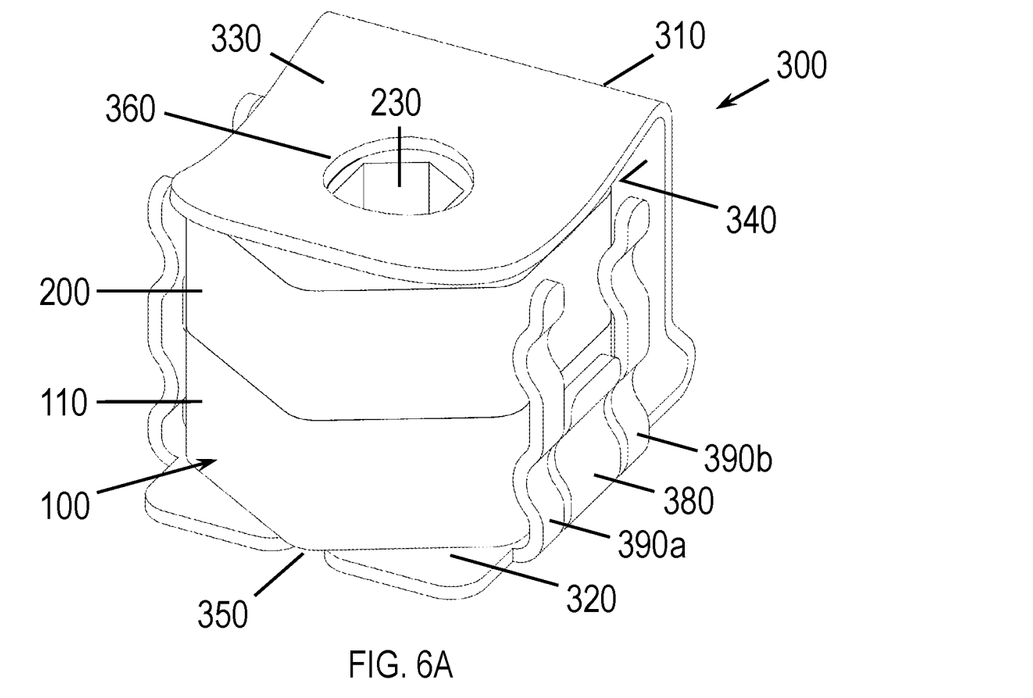
FIG. 6A illustrates a perspective view of a valve subassembly, according to an embodiment of the present disclosure.
Figure 6B:
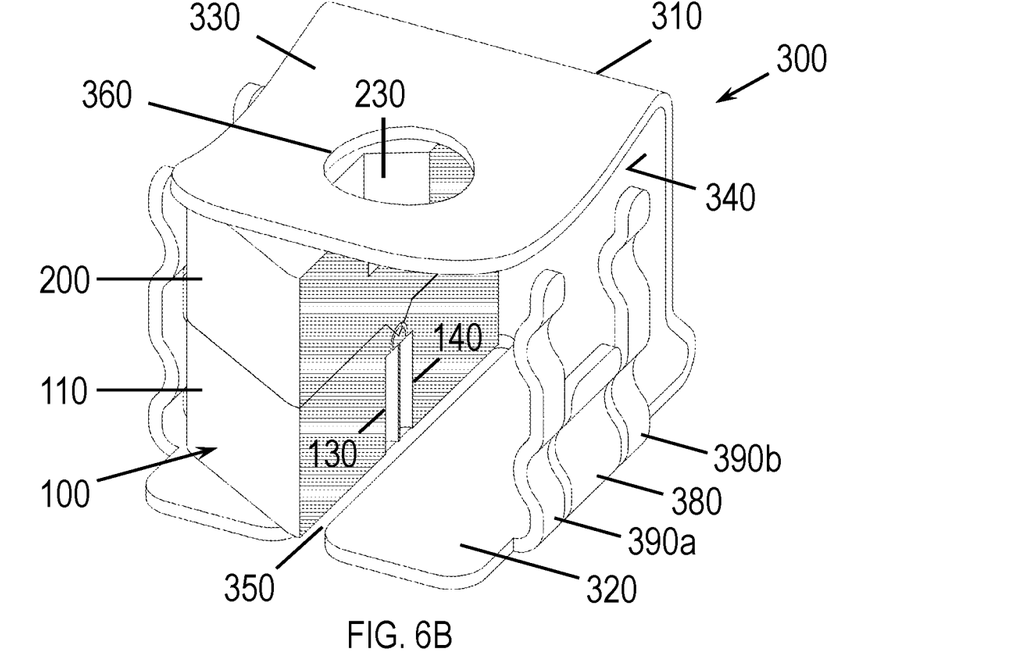
FIG. 6B illustrates a perspective view of a valve subassembly, with the valve shown having a cut-away view, according to an embodiment of the present disclosure.
Figure 6C:
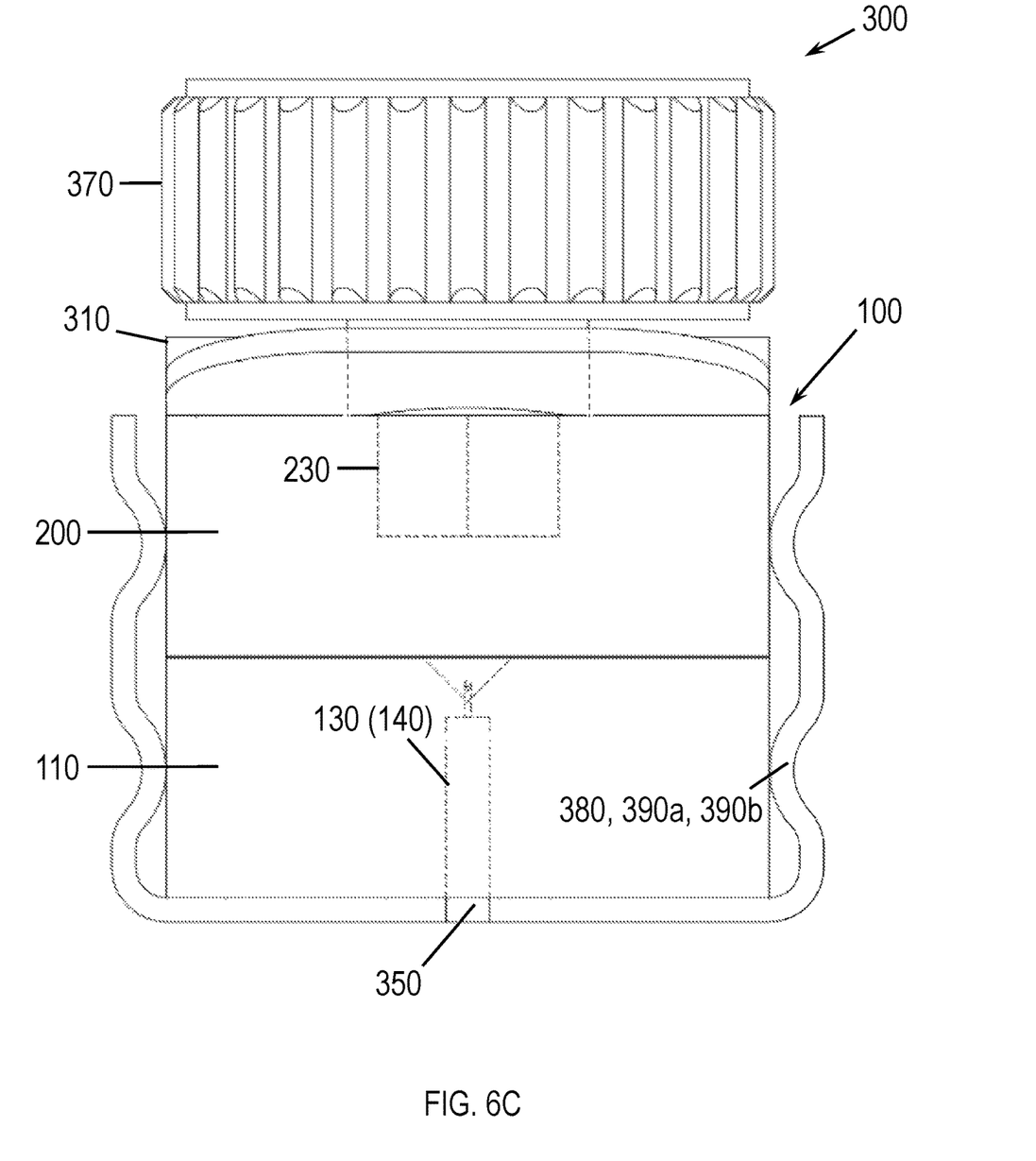
FIG. 6C illustrates a front view of a valve subassembly, the subassembly including an optional knob for actuation, according to an embodiment of the present disclosure.

FIG. 6A-6C illustrate a valve subassembly 300. A clip 310 may be used to provide additional functionality for the valve 100, such as holding and maintaining alignment. The clip 310 comprises bottom 320 and top 330 flanges that hold the substrates 110, 200 together. Top 320 and bottom 310 flanges may be joined by a base 340 which also serves as a datum for the hexagonal substrate pair 110, 200. When inserted into the clip 310, the valve 100 stops on the base flange 340. A hole 360 may be formed in the top flange 330 to allow access to the socket 230 in the top substrate 200 in order to effectuate a rotation. The hole 360 may be used to align a tool to the socket 230 and to prevent the tool from exerting shear (lateral) forces between the first 110 and 200 second substrates. The clip 310 may include two sets of side flanges. The flanges are segmented into a lower flexible finger 380 and first and second upper flexible fingers 390a, 390b. The lower flexible finger 380 may be configured to contact the first (bottom) substrate 110 such that the first substrate 110 remains stationary upon application of a rotational force to the second (top) substrate 200. Similarly, each set of first and second upper fingers 390a, 390b may be configured to contact the second (top) substrate 200 at two or more points at all positions of rotation. First and second upper fingers 390a, 390b may flex with the rotation of the top substrate 200. When the top substrate 200 is rotated, fingers 390a, 390b are configured to align the top substrate 200 to the bottom substrate 110; in this manner, angular rotational may be indexed (constrained to certain positions)—in this case, at an integer multiple of 30° (0°, 30°, 60°, 90°, etc.). Consequently, the valve 100 may be aligned (open), or misaligned (closed) by a predetermined amount with the assistance of force-feedback. Referring to FIG. 6B, a slot 350 or hole in the bottom flange 320 allows access to the input 130 and output vias 140 for insertion of input and output capillaries (not shown). Additionally, the slot 350 may be used to aid the retention of the capillaries. As an alternative to tool operation, as shown in FIG. 6C, an element such as a knob 370 may be inserted into the socket 230 in order to facilitate manual operation.

Figure 7:
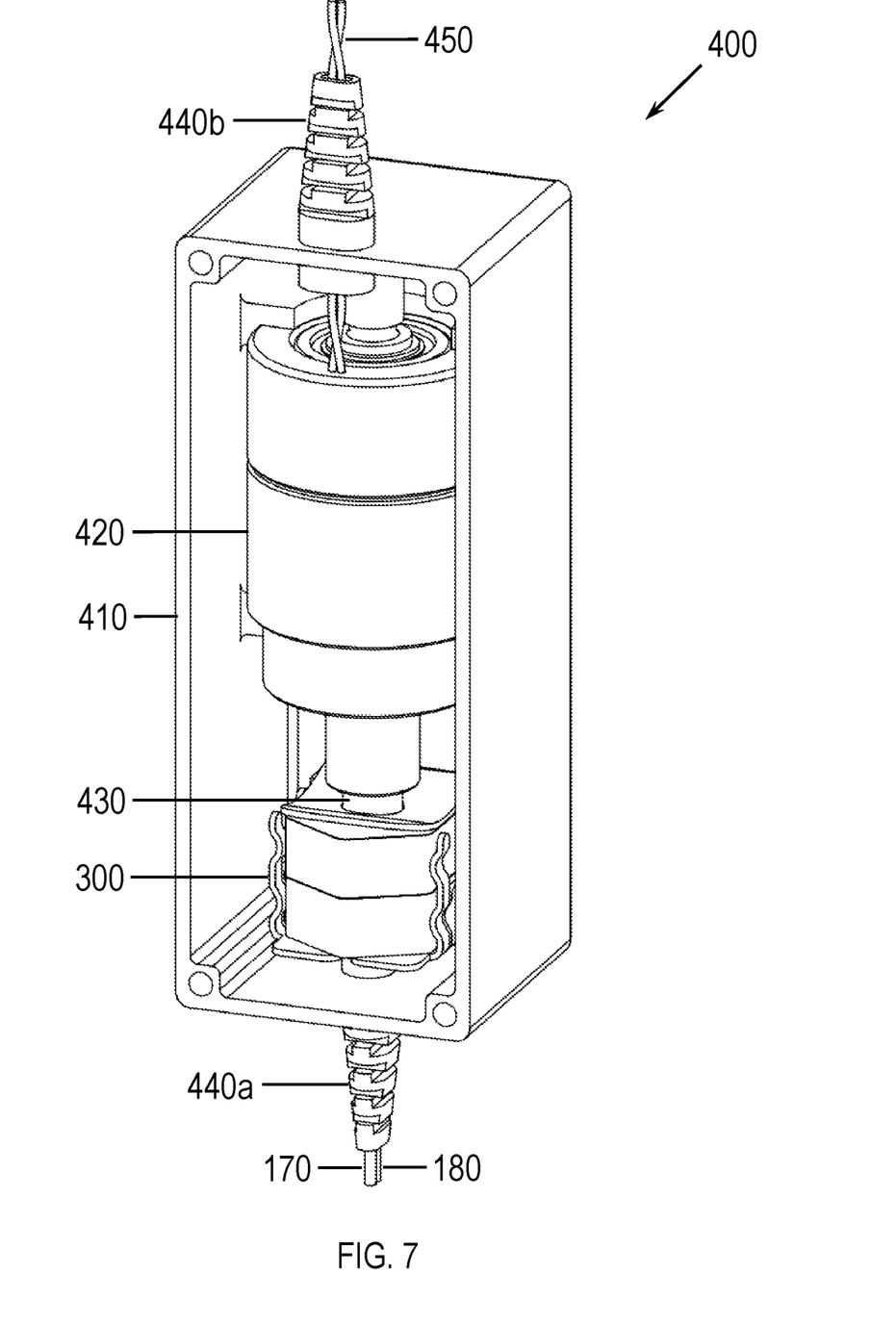
FIG. 7 illustrates a perspective view of a valve module, according to an embodiment of the present disclosure.

Referring now to FIG. 7, a valve module 400 is shown. The module 400 may include a valve subassembly 300 inserted into a housing 410. A rotational solenoid 420 may also be assembled into the housing 410 such that it is coaxial with the valve's 100 axis of rotation. The valve socket 230 may be connected to the solenoid 420 by a shaft 430. Input 170 and output 180 capillaries may pass through the wall of housing 410, the capillaries 170, 180 being protected by a strain relief 440a. Electrical input wires 450 may also pass through the housing 410 and may be protected by a strain relief 440b. A lid (not shown—omitted for clarity) can be used to seal the housing 410 against the environment. When the solenoid 420 is actuated, the valve 100 opens or closes, depending on the initial configuration of the valve 100. Alternatively, the solenoid 420 may be replaced with a stepper motor, thereby making the module 400 a controllable valve.

Figure 8A:
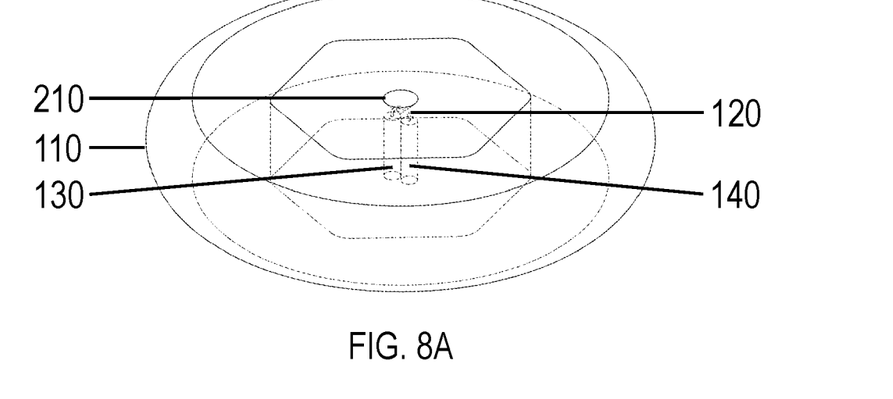
FIG. 8A illustrates a perspective view of a process flow for valve fabrication comprising a first substrate with irradiation, according to an embodiment of the present disclosure.
Figure 8B:
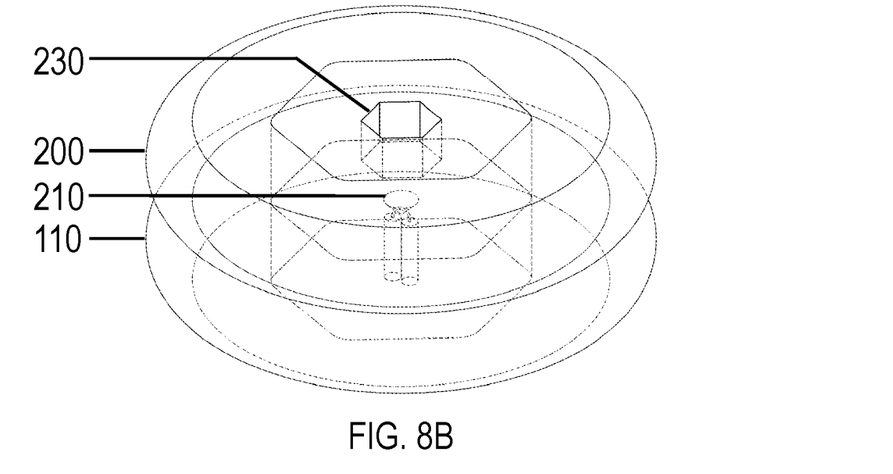
FIG. 8B illustrates a perspective view of a process flow for valve fabrication comprising a second substrate welded to the first substrate as shown in FIG. 8A, further comprising a second irradiation, according to an embodiment of the present disclosure.
Figure 8C:
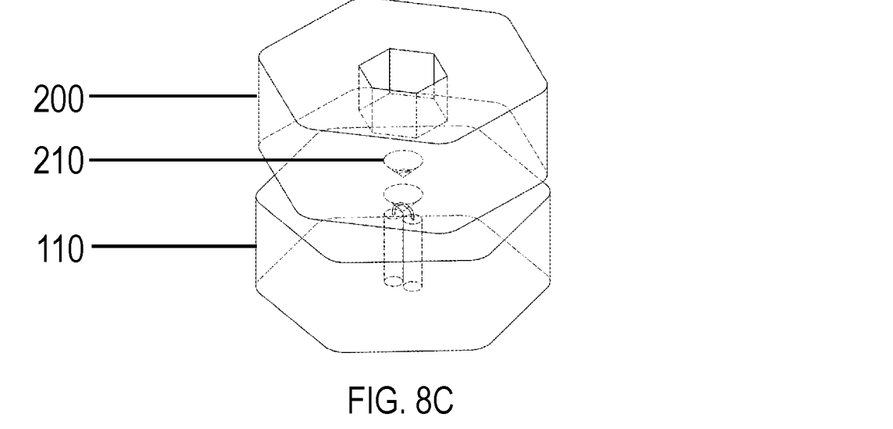
FIG. 8C illustrates a perspective view of a process flow for valve fabrication comprising an etch and release of chip-shaped valve elements, according to an embodiment of the present disclosure.

FIGS. 8A-8C show a method for fabrication of the microvalve 100. This method may be used to fabricate any of the embodiments of valve 100 contemplated within this disclosure. Referring now to FIG. 8A, a first, transparent substrate 110, which may be glass, is irradiated with a series of femtosecond laser pulses. The pulses are used to irradiate (write) volume pixels, or voxels, which are selectively etchable using wet chemistry. The voxels are written into the substrate 110 to form a 3-dimensional microchannel 120, which extends from one surface of a first glass substrate 110 to the same or a second surface. Here, input 130 and output 140 vias are formed for use with capillaries; however, the microvalve 100 may be deployed for other environmental uses, as previously discussed. A rotatable element 210 (e.g., a cone) is irradiated such that its surface intersects the channel 120 and also extends to the top surface of the first substrate 110. Hexagonal substrate (chip) extents may also be written to define the valve datums. In FIG. 8B, a second transparent substrate 200, such as glass, may be disposed on the first substrate 110. A laser-induced weld is formed at the interface between the rotatable element 210 and the second substrate 200. Hexagonal chip extents are written in the second (top) substrate 200 to define the valve datums, typically matching those of the first (bottom) substrate 110. Additional features may be formed in the second substrate 200, such as a socket 230. The two, now-welded substrates 110, 200 may then be subjected to wet etch chemistry which selectively removes the irradiated material. In particular, the rotatable element 210 profile (e.g., cone shape) is etched such that the two substrates 110, 200 become separable, with the rotatable element 210 attached to the second substrate 200, as illustrated in FIG. 8C.

Figures 9A, 9B, 9C, 9D:
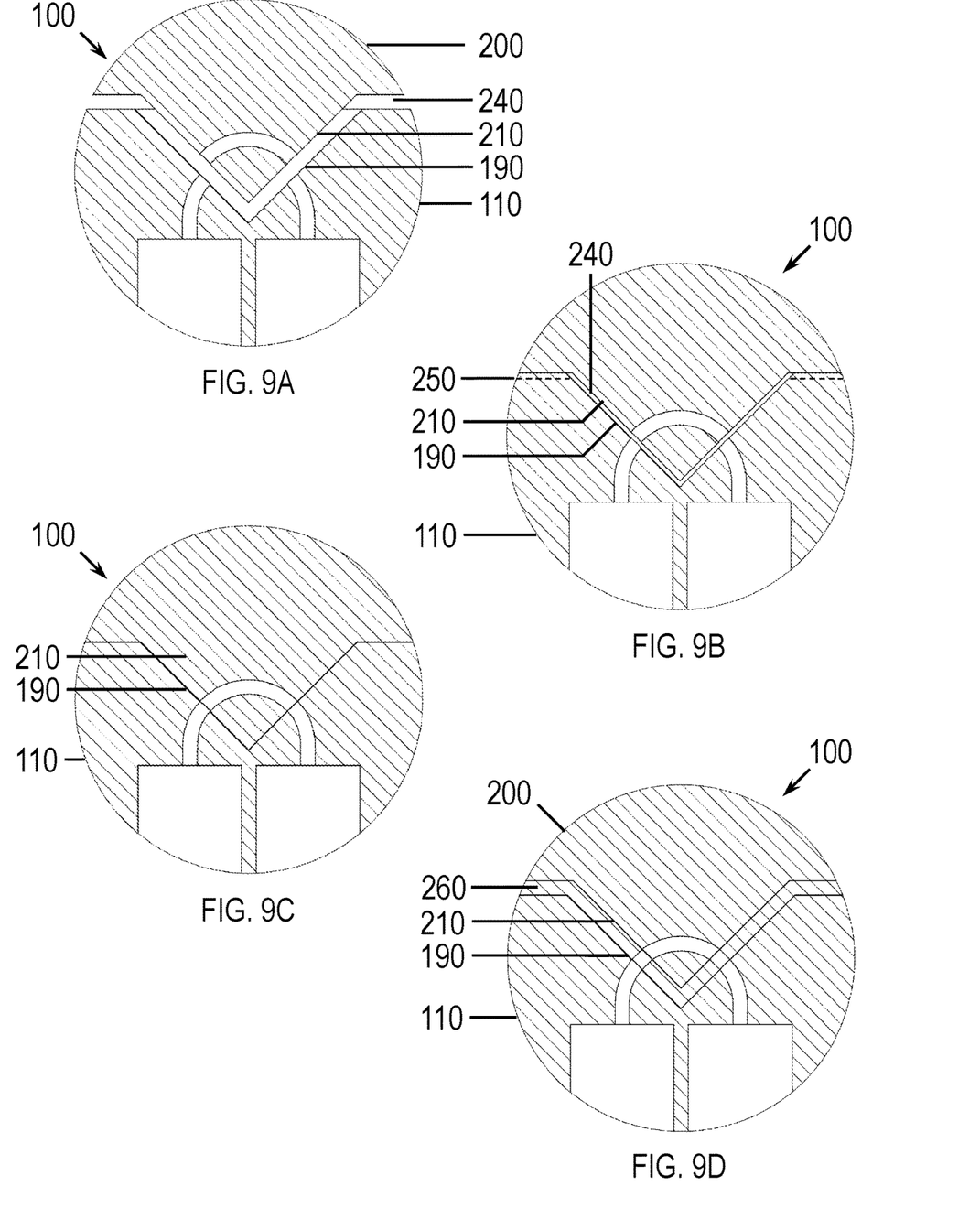
FIG. 9A illustrates a sectional view of a valve during a method step characterized by irradiation and etching, according to an embodiment of the present disclosure.
FIG. 9B illustrates a sectional view of a valve during a method step characterized by mating substrates, according to an embodiment of the present disclosure.
FIG. 9C illustrates a sectional view of a valve during a method step characterized by bottom substrate polish, according to an embodiment of the present disclosure.
FIG. 9D illustrates a sectional view of a valve during a method step characterized by re-mating substrates, according to an embodiment of the present disclosure.

Referring now to FIGS. 9A-9D, the fabrication process described above generally produces a gap 240 between surfaces formed by first substrate 110 and second substrate 200 and the rotatable element 210. Those surfaces that are intended to mate, such as the cone 210 and its matching recess 190, as shown schematically in FIG. 9A. The gap 240 resulting from the fabrication process is due to two effects: first, the voxels have a non-zero volume giving rise to an etched curf, and second, most substrates, such as bulk glass, have a finite etch rate in the wet chemistry, causing the gap to widen with increasing etch time. After etching to separation, the substrates 110, 220 may be re-mated, as shown in FIG. 9B. The gap 240 is now smaller, but still present. For example, a curf of 5 µm would result in a gap of 1.46 µm measured at the shortest distance between the cone 210 and recess 190 surfaces. Normally such a gap 240 would allow fluid to bypass the cone microchannel, allowing leakage when the valve is closed. However, here the present disclosure provides three ways in which such a gap 240 may be removed, two process-related and one structural.

In the first process-related method, one additional process step is used to remove the gap 240. Referring again to FIG. 9B, after substrate separation, the top side of the first substrate 110 may be mechanically polished by an amount not less than the vertical dimension formed by the re-mated gap 240. For example, if the post-etch curf is 5 µm, then the distance between two vertically aligned points along a horizontal surface will be 5 µm. However, the difference between two vertically aligned points on the cone 210 and recess 190 will be 5 µm/sin(45°)=7.07 µm, and, after remating, equal to 7.07−5=2.07 µm. Thus, the minimum polish depth is 2.07 µm. An example of the minimum polish point 250 is represented as a dashed line in FIG. 9B. In FIG. 9C, after polishing to a depth of 2.07 µm, the first 110 and second 200 substrates are re-mated. The cone 210 now reaches the bottom of the recess 190. At this point the surfaces provide the best possible seal to prevent leakage.

In the second process-related method, one additional process step is used to remove the gap 240. Using the example of FIG. 9D, after substrate separation, the gap 240 may be filled with a suitable thin-film material 260, such as a metal, a polymer or a dielectric. This may be achieved via deposition of a conformal (isotropic) layer applied to the top side of the first substrate 110, the bottom side of the second substrate 200, or any combination of the two wherein the total thickness of the deposited layer(s) is equal to or greater than the original gap 240. Following the example of a 5 µm curf, the total thickness of the deposited layer(s) must be ≥5 µm. Alternatively, if the layer can be applied solely to the cone 210 and/or recess 190 surfaces, i.e. masked, then the minimum total thickness is 1.46 µm. Alternatively, an anisotropic deposition method may be used. In this method the layer thickness is constant with respect to the horizontal surface normal, and is therefore thinner on angled surfaces, such as the cone 210. By contrast, the layer thickness of a conformal (isotropic) deposition is constant with respect to the local surface normal, and therefore the same on horizontal and angled surfaces. If an anisotropic deposition method is used, then, the minimum total thicknesses of our example become 7.07 and 2.07 µm for the unmasked and masked cases, respectively.

Figure 10A:
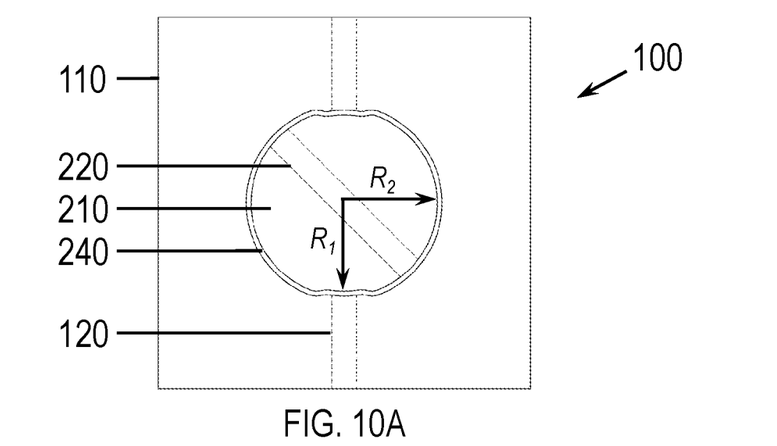
FIG. 10A illustrates a top view of a valve with gap compensation features (the top substrate being omitted for clarity), showing an as-fabricated configuration with a gap between the rotational element and the first substrate, according to an embodiment of the present disclosure.
Figure 10B:
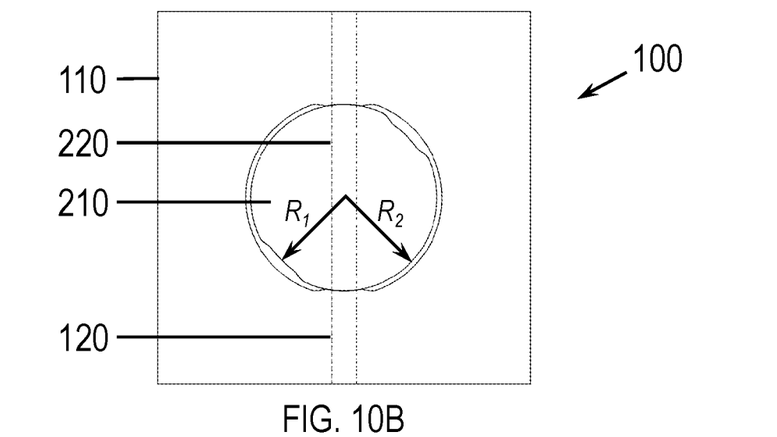
FIG. 10B illustrates a top view of a valve with gap compensation features (the top substrate being omitted for clarity), showing an open valve state, according to an embodiment of the present disclosure.
Figure 10C:
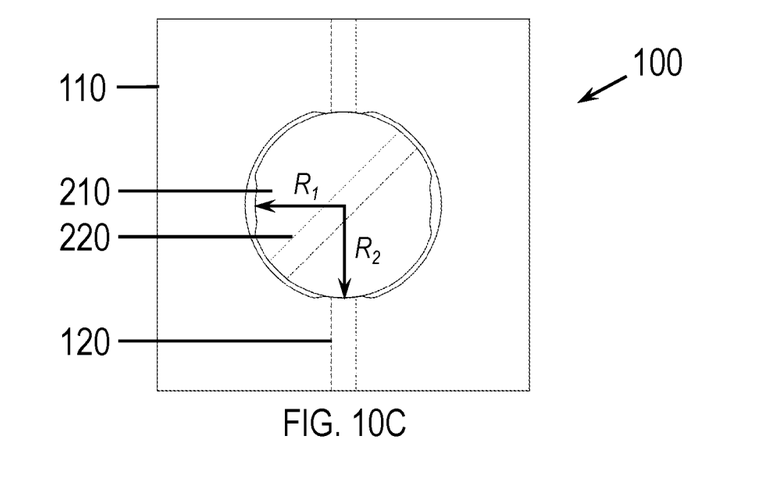
FIG. 10C illustrates a top view of a valve with gap compensation features (the top substrate being omitted for clarity), showing a closed valve state, according to an embodiment of the present disclosure.

Regarding the structural method, the gap 240 removal process is shown in FIGS. 10A-10C. In FIG. 10A, the rotatable element 210 may have two radii, one for the microchannel 120 intercept, $R_1$, and a slightly larger one for the perimeter outside of the channel 120 intercept, $R_2$. The matching microchannel 220 within the rotatable element 210 is fabricated at an angle to the substrate microchannel 120. After the rotatable element 210 has been welded to the second (top) substrate 200 (not shown), and once the substrates have been etched, a gap 240 appears at the original interface between the rotatable element 210 and first substrate 110 as previously described. The radii are chosen such that the difference, $R_2-R_1$, is equal to, or slightly smaller than, gap 240. In FIG. 10B, the rotatable element 210 has been rotated to align the substrate 120 and element 220 channels. In this position, the valve 100 is open. In FIG. 10C, the rotatable element 210 has been rotated such that substrate 120 and element 220 channels are misaligned, while the larger radius, $R_2$, portion of the rotatable element 210 blocks the substrate channel 120. In this position, the valve 100 is closed. In this way, the surfaces provide the best possible seal against leakage.

Figure 11A:
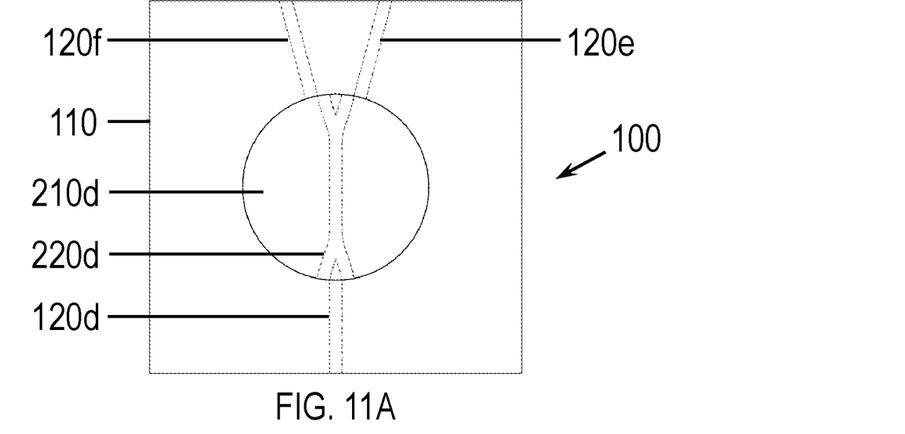
FIG. 11A illustrates a top view of a valve with multiple outputs (the top substrate being omitted for clarity), showing an as-fabricated configuration in a closed position, according to an embodiment of the present disclosure.
Figure 11B:
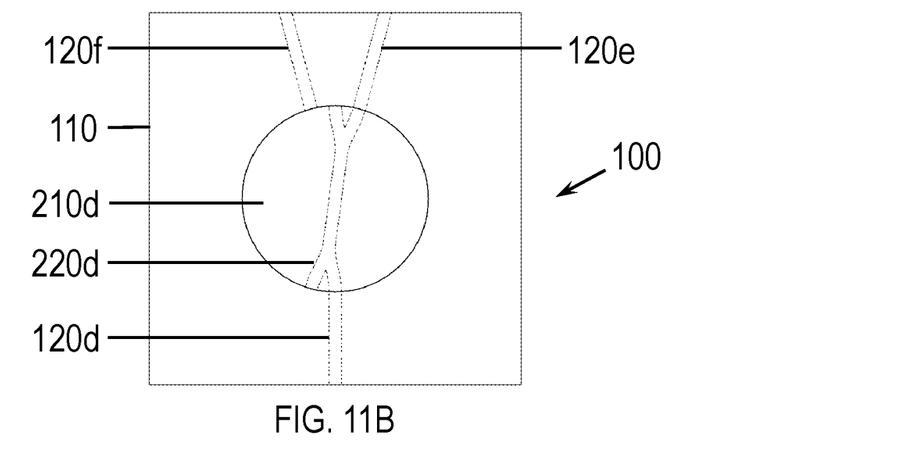
FIG. 11B illustrates a top view of a valve with multiple outputs (the top substrate being omitted for clarity), showing an open-to-the-right output channel valve state, according to an embodiment of the present disclosure.
Figure 11C:
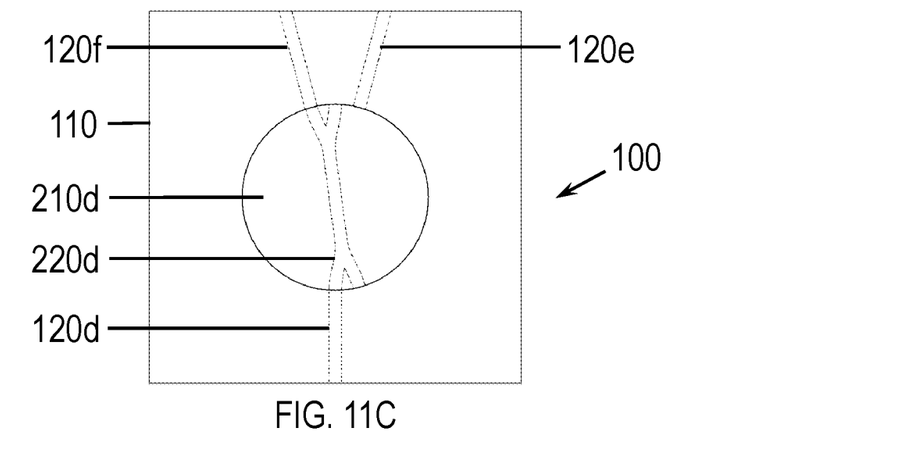
FIG. 11C illustrates a top view of a valve with multiple outputs (the top substrate being omitted for clarity), showing an open-to-the-left output channel valve state, according to an embodiment of the present disclosure.

In an alternative embodiment, FIG. 11A-11C illustrates a microchannel valve 100 configured for switching between two or more output channels. Referring to FIG. 11A, a first substrate 110 has a single input channel 120d and two output channels 120e and 120f (second substrate 200 is not shown for clarity). As fabricated, the rotatable element 210d may be oriented in the closed position and no flow occurs between the input 120d and outputs 120e, 120f. In FIG. 11B, the rotatable element 210d has been rotated to align the element channel 220 so that the input channel 120d is connected to the right output channel 120e. In FIG. 11C, the rotatable element 210d has been rotated to align the element channel 220d so that the input channel 120d is connected to the left output channel 120f. Thus, one input stream may be demultiplexed into two or more output streams. Conversely, the arrangements of FIGS. 11A-11C may be run in the reverse direction, thereby allowing multiple input streams to be multiplexed into a single output stream. In another embodiment, the output channels may lie in different horizontal planes, but lie within the same vertical plane (i.e., the plane formed from top to bottom). In this case, the element channels 220d cross over and under each other. Using non-intersecting channel crossings decouples the sense of rotation from the location of the output. For example, a clockwise rotation may be used to divert the flow to a counterclockwise output and vice versa.

The previous description of the disclosed embodiments is provided to enable any person skilled in the art to make or use the invention. Various modifications to these embodiments will be readily apparent to those skilled in the art, and the generic principles defined herein can be applied to other embodiments without departing from the spirit or scope of the invention. For example, transparent materials other than glass, such as sapphire, may be used for fabrication of the chip/substrate. It is therefore desired that the present embodiments be considered in all respects as illustrative and not restrictive, reference being made to the appended claims as well as the foregoing descriptions to indicate the scope of the invention.

What is claimed is:

1. A glass microchannel valve comprising:
    a first substrate with an upper surface defining a plane, said first substrate including a first microchannel disposed below said plane; and
    a rotatable element disposed on a second substrate, said rotatable element intersecting said first microchannel below said plane, said rotatable element including a second microchannel formed therethrough;
    wherein rotation of said second substrate induces rotation of said rotatable element such that, in a first operable position, said first microchannel aligns with said second microchannel to allow flow of a fluid therein, and in a second operable position, said first microchannel misaligns with said second microchannel to not allow flow of said fluid therein.

2. The microchannel valve of claim 1 wherein said rotatable element includes a rotationally-symmetric shape selected from the group consisting of a cone, a cylinder, and a sphere.

3. The microchannel valve of claim 1 wherein said first and second microchannels have a corresponding cross-sectional profile configured to modulate the fluid flow rate as a function of an increasing angle of rotation of said rotatable element, said function being selected from the group consisting of: substantially linear and substantially nonlinear, and a combination of linear and nonlinear.

4. The microchannel valve of claim 1 wherein said first and second microchannels are aligned using one or more datums and/or alignment keys formed in extents of said first substrate and/or said second substrate.

5. The microchannel valve of claim 1 wherein rotation of said second substrate relative to said first substrate is achieved by a socket formed in a top of said second substrate.

6. The microchannel valve of claim 1 wherein said first microchannel further comprises one or more changes in size and/or shape configured to couple to a capillary thereby forming one or more vias.

7. The microchannel valve of claim 6 wherein said one or more vias provide a capillary extraction force greater than the capillary insertion force.

8. The microchannel valve of claim 7 wherein said capillary extraction force and said capillary insertion force are imparted on said one or more vias through one or more barbs disposed therein.

9. The microchannel valve of claim 8 wherein said barbs are rigid.

10. The microchannel valve of claim 8 wherein said barbs are flexible.

11. The microchannel valve of claim 1 further comprising an apparatus configured to maintain contact, axial alignment, and relative rotational alignment between said first and second substrates.

12. The microchannel valve of claim 11 wherein said apparatus includes a clip.

13. The microchannel valve of claim 12 wherein said apparatus further comprises a rotational actuator.

14. The microchannel valve of claim 13 wherein said rotational actuator is coupled to said second substrate and is selected from the group consisting of a solenoid and a stepper motor.

15. The microchannel valve of claim 12 wherein said clip is made of a metal.

16. The microchannel valve of claim 1 wherein said rotational element comprises a perimeter including first and second radii, said first radius being disposed along a first portion of said perimeter that is separated from said second microchannel, said second radius being disposed along a second portion of said perimeter that surrounds either end of said second microchannel, said second radius further disposed along a third portion of said perimeter that is also separate from said second microchannel;
    wherein the difference of said second radius and said first radius forms a dimension substantially the same as a gap formed between said first and second substrates;
    and wherein the rotational element is initially formed when said first microchannel is disposed adjacent said first position, such that, in operation, said gap is closed when said rotatable element is in said first operable position corresponding to said first microchannel being disposed adjacent said second portion of said perimeter that surrounds either end of said second microchannel, and said gap remains closed when said rotatable element is in said second operable position corresponding to said first microchannel being disposed adjacent said third portion of said perimeter that is separate from said second microchannel.

17. A method of manufacturing a glass microchannel valve, the method comprising:
    providing a first substrate with an upper surface defining a plane;
    irradiating said first substrate with femtosecond laser pulses to define a first microchannel below said plane;
    irradiating a rotatable element within said first substrate below said plane, said rotatable element being configured with a second microchannel for fluidly communicating with said first microchannel;
    coupling said rotatable element to a second substrate;
    etching said first and second substrates until separation is achieved; and
    mating said first and second substrates to form the glass microchannel valve.

18. The method of claim 17 further comprising removing a gap formed between said first and second substrates, said removal selected from the group consisting of polishing said first substrate, depositing one or more films on said first substrate, depositing one or more films on said second substrate, and depositing one or more films on both said first and said second substrates.

19. The method of claim 17 further comprising removing a gap formed between said first and second substrates wherein said rotational element comprises a perimeter including first and second radii, said first radius being disposed along a first portion of said perimeter that is separated from said second microchannel, said second radius being disposed along a second portion of said perimeter that surrounds either end of said second microchannel, said second radius further disposed along a third portion of said perimeter that is also separate from said second microchannel;
    wherein the difference of said second radius and said first radius forms a dimension substantially the same as a gap formed between said first and second substrates;
    and wherein the rotational element is initially formed when said first microchannel is disposed adjacent said first position, such that, in operation, said gap is closed when said rotatable element is in a first operable position corresponding to said first microchannel being disposed adjacent said second portion of said perimeter that surrounds either end of said second microchannel, and said gap remains closed when said rotatable element is in a second operable position corresponding to said first microchannel being disposed adjacent said third portion of said perimeter that is separate from said second microchannel.

20. The method of claim 17 further comprising irradiating one or more vias within said first substrate, each of said one or more vias being in fluid communication with a respective end of said first microchannel.

* * * * *